(12) United States Patent
Liu et al.

(10) Patent No.: US 9,268,062 B2
(45) Date of Patent: Feb. 23, 2016

(54) ARTIFICIAL ELECTROMAGNETIC MATERIAL

(75) Inventors: Ruopeng Liu, Shenzhen (CN); Lin Luan, Shenzhen (CN); Yuqin Xu, Shenzhen (CN); Zhiya Zhao, Shenzhen (CN); Chaofeng Kou, Shenzhen (CN)

(73) Assignees: KUANG-CHI INNOVATIVE TECHNOLOGY LTD., Shenzhen (CN); KUANG-CHI INSTITITE OF ADVANCED TECHNOLOGY, Shenzhen (CN)

( * ) Notice: Subject to any disclaimer, the term of this patent is extended or adjusted under 35 U.S.C. 154(b) by 718 days.

(21) Appl. No.: 13/635,863

(22) PCT Filed: Oct. 27, 2011

(86) PCT No.: PCT/CN2011/081389
§ 371 (c)(1),
(2), (4) Date: Sep. 18, 2012

(87) PCT Pub. No.: WO2012/139368
PCT Pub. Date: Oct. 18, 2012

(65) Prior Publication Data
US 2013/0089715 A1    Apr. 11, 2013

(30) Foreign Application Priority Data

Apr. 12, 2011 (CN) .......................... 2011 1 0091287
May 10, 2011 (CN) .......................... 2011 1 0120011
May 10, 2011 (CN) .......................... 2011 1 0120041

(51) Int. Cl.
*G02B 1/00* (2006.01)
*C01B 31/02* (2006.01)
(Continued)

(52) U.S. Cl.
CPC ................. *G02B 1/002* (2013.01); *B82Y 20/00* (2013.01); *B82Y 30/00* (2013.01); *B82Y 40/00* (2013.01);
(Continued)

(58) Field of Classification Search
CPC .................. Y10T 428/24802; H01Q 15/0086; G02B 1/002–1/007; G02F 2202/30
See application file for complete search history.

(56) References Cited

U.S. PATENT DOCUMENTS 7,403,683 B2 * 7/2008 Chern et al. ..................... 385/39
2001/0038325 A1 * 11/2001 Smith et al. ................... 333/202
(Continued)

FOREIGN PATENT DOCUMENTS

CN          101597810 A        12/2009
CN          101694558 A         4/2010

OTHER PUBLICATIONS

"Chemical Information Profile for Indium Tin Oxide" Jun. 2009, acquired from http://ntp.niehs.nih.gov/ntp/noms/support_docs/ito060309_508.pdf.*
Boltasseva et al. "Low-Loss Plasmonic Metamaterials", Science, 2011, vol. 331, p. 290-291.*
(Continued)

*Primary Examiner* — Gerard Higgins
(74) *Attorney, Agent, or Firm* — Leason Ellis LLP.

(57) ABSTRACT

An artificial electromagnetic material is provided. The artificial electromagnetic material includes at least one material sheet. Each material sheet includes a laminary substrate and a plurality of artificial microstructures attached to the substrate. The substrate is made from transparent material. Because the substrate is made from transparent material, therefore the artificial electromagnetic material is capable of generating responses to visible light wave and convergence, divergence, deflection of visible light wave and so on can be achieved.

18 Claims, 4 Drawing Sheets

(51) Int. Cl.
  *B82Y 20/00*   (2011.01)
  *B82Y 30/00*   (2011.01)
  *H01Q 15/00*   (2006.01)
  *H01Q 15/08*   (2006.01)
  *B82Y 40/00*   (2011.01)
  *G02B 5/00*    (2006.01)

(52) U.S. Cl.
  CPC ............ C01B 31/022 (2013.01); H01Q 15/006 (2013.01); H01Q 15/0026 (2013.01); H01Q 15/08 (2013.01); *G02B 5/008* (2013.01); *G02F 2202/30* (2013.01); *G02F 2202/36* (2013.01); *G02F 2202/40* (2013.01); *Y10T 428/24802* (2015.01); *Y10T 428/24942* (2015.01)

(56) References Cited

U.S. PATENT DOCUMENTS

| | | | |
|---|---|---|---|
| 2005/0161630 A1* | 7/2005 | Chui et al. | ............ 252/62.51 R |
| 2007/0189666 A1 | 8/2007 | Kornilovich | |
| 2010/0271692 A1 | 10/2010 | Hor et al. | |

OTHER PUBLICATIONS

Siddhartha Bhowmik et al:"Metallic nanostructures in a polymer matrix and substrate fabrication and structural characterization", Applied Physics A; Materials Science & Processing, Springer, Berlin, DE, vol. 103, No. 4, Oct. 19, 2010, pp. 1117-1123, XP19912352, ISSN: 1432-0630, DOI: 10.1007/S0039-010-6052-Y p. 1119-p. 1123.

Takeyasu N et al:"Fabrication of 3D metal/polymer microstructures by site-selective metal coating", Applied Physics A; Materials Science & vol. 90, No. 2, Oct. 26, 2007, pp. 205-209, XP019562022, ISSN: 1432-0630, DOI: 10.1007/S00339-007-4298-9, The Whole Document.

Zhao Wet et al:"Fabrication and characterization of metamaterials at optical frequencies", Optical Materials, Elsevier Science Publishers B.V. Amsterdam, NL, vol. 32, No. 3, Jan. 1, 2010, pp. 422-426, XP026795868,ISSN: 0925-3467 [retrieved on Nov. 4, 2009].

P.R. West et al:"Searching for better plasmonic materials", Laser & Photonics Reviews, vol. 4, No. 6, Nov. 2, 2010, pp. 795-808, XP055150697, ISSN: 1863-8880, DOI: 10.1002/1por.200900055 p. 799-p. 800.

* cited by examiner

ARTIFICIAL ELECTROMAGNETIC MATERIAL

CROSS-REFERENCE TO RELATED PATENT APPLICATIONS

This is a U.S. National Phase Application under 35 U.S.C. §371 of International Patent Application No PCT/CN2011/081389 filed Oct. 27, 2011, and claims the priority of Chinese Patent Application Nos. CN201110120011.X and. CN201110120041.0 both filed May 10, 2011 and CN 201110091287.X filed Apr. 12, 2011, all of which are incorporated by reference herein.

FIELD OF THE INVENTION

The present invention relates to material, and particularly to an artificial electromagnetic material.

BACKGROUND OF THE INVENTION

Metamaterials, normally known as artificial electromagnetic materials, are new synthetic artificial materials which can generate responses to electromagnetic waves, composed of at least one substrate and a plurality of artificial microstructures embedded into the substrate. The artificial microstructures are usually made from metal wires and configured into a certain geometric structure. Therefore, the artificial microstructure is capable of generating responses to electromagnetic waves. Therefore the metamaterials usually perform electromagnetic properties which are different from electromagnetic properties of the substrate. The electromagnetic properties can achieve some special functions that common materials can not achieve, such as to achieve convergence or divergence for electromagnetic waves and so on. It can be applied in the electromagnetic communication filed such as the antennas and radars.

In theory the metamaterial can be applied to electromagnetic waves of different frequency ranges, however currently application fields for the metamaterial are usually limited to the electromagnetic communication field while inoperative to visible light wave. This is limited by the materials of the substrate and the material of the artificial microstructures. If the problem that using the metamaterials for convergence, divergence for the visible light wave is solved, the application range of the metamaterials can be extended to visible light wave.

DISCLOSURE OF THE INVENTION

An artificial electromagnetic material is provided in the invention, including at least one material sheet, each material sheet including a laminary substrate and a plurality of artificial microstructures attached to the substrate. The substrate is made from transparent material.

The substrate is made from transparent polymer material,

The substrate is made from polymethyl methacrylate.

The substrate is made from transparent polyurethane, polyethylene, polyethylene glycol terephthalate or PVC.

The light transmittance of the artificial electromagnetic material is equal to or greater than 85%.

The artificial microstructures are made from indium tin oxide, the indium tin oxide is a mixed material composed of $In_2O_3$ and $SnO_2$ A mass percentage of $In_2O_3$ of the indium tin oxide is ranged from 80% to 95%.

The mass percentage of $In_2O_3$ is 90%.

The indium tin oxide is manufactured into a film and the thickness of the film is ranged from 50 to 1000 nm.

The artificial microstructure is a carbon nanotube film with geometric patterns.

A light transmittance of the carbon nanotube film is equal to or greater than 80%.

The thickness of the carbon nanotube film is ranged from 50 to 1000 nm.

The carbon nanotube film includes an ion conductive polymer adhesive and the carbon nanotubes dispersed in the electrical conductive polymer adhesive.

The artificial microstructure is an aluminum doped zinc oxide thin films with geometric patterns.

A light transmittance of the aluminum doped zinc oxide thin film is greater than 80%.

The thickness of aluminum doped zinc oxide thin film is ranged from 50 to 1000 nm, Refractive indexes of the material sheet vary according to a number of concentrical circles.

Each substrate is virtually divided into a variety of substrate units arranged in an array. One artificial microstructure is attached to each of substrate units respectively. A material unit is composed of a substrate unit and an artificial microstructure attached to the substrate unit.

The material unit in the center of material sheet is treated as the center of the concentrical circles. Material units which have the same distance to the center of the concentrical circles are positioned on the same circle. The refractive indexes of material units positioned on the same circle are the same. The refractive indexes of the material units decrease when the radius of the circle increases. Refractive index difference value between two adjacent circles gradually increases when the radiuses of the circles increase.

Each of material sheets includes a plurality of artificial microstructures. The plurality of artificial microstructures is attached to the substrate arranged in an array. The sizes of the plurality of artificial microstructures decrease along one direction of the array.

The artificial electromagnetic material of the invention has the following beneficial effects: because the substrate is made from transparent materials, therefore is capable of generating responses to visible light wave, which causing convergence, divergence, deflection and so on.

BRIEF DESCRIPTION OF THE DRAWINGS

Other aspects, features, and advantages of this invention will become apparent from the following detailed description when taken in conjunction with the accompanying drawings, which are a part of this disclosure and which illustrate, by way of example, principles of this invention.

DETAILED DESCRIPTION OF ILLUSTRATED EMBODIMENTS

Figure 1:
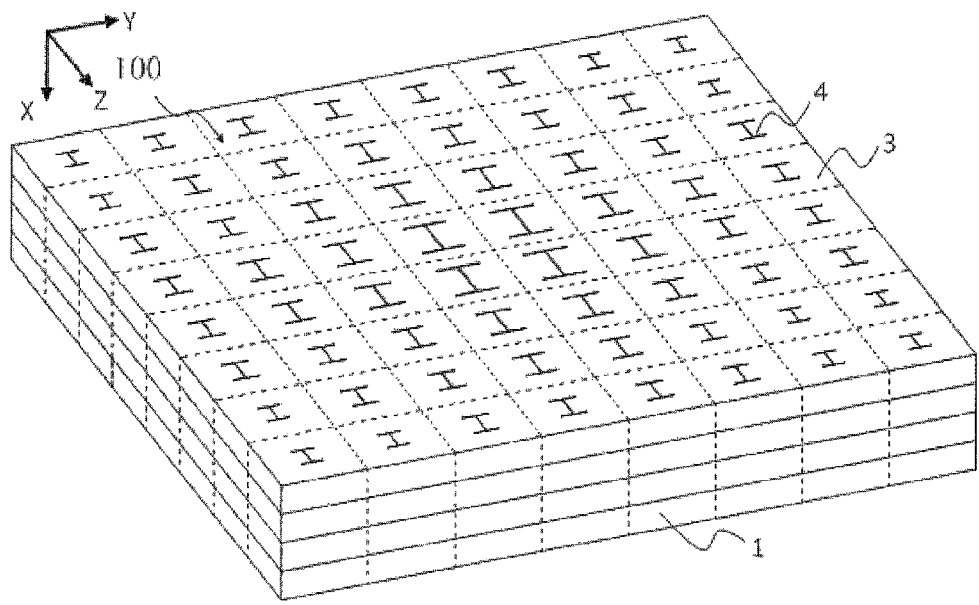
FIG. 1 illustrates an artificial electromagnetic material of a first embodiment of the invention.
Figure 2:
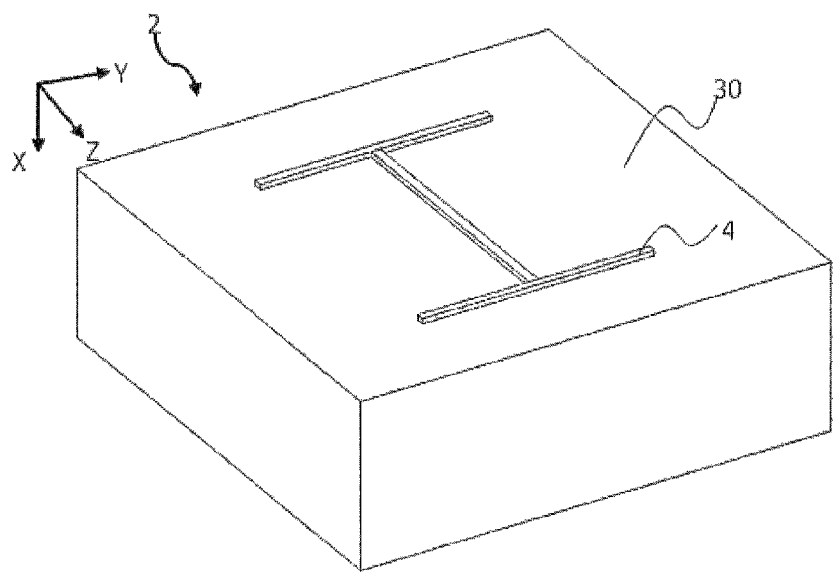
FIG. 2 illustrates a material unit of the artificial electromagnetic material of FIG. 1.

Referring to FIG. 1 and FIG. 2, the invention relates to an artificial electromagnetic material 100. The artificial electromagnetic material 100 includes at least one material sheet 1. If there are several material sheets 1, the material sheets are stacked along the X direction perpendicular to the outer surface to form into one whole. Each material sheet 1 includes a laminary substrate 3 and a plurality of artificial microstructures 4 attached to the laminary substrate 3. The laminary substrate 3 is virtually divided into a plurality of identical rectangular grids. Each grid is a substrate unit 30, and an artificial microstructure 4 is attached to each substrate unit 30. A material unit 2 is composed of a substrate unit 30 and an artificial microstructure 4 attached to the substrate unit 30. The material sheet 1 can be defined as a plurality of material units 2 arranged in an array. In the array, the Z direction is defined as a direction of rows and the Y direction is defined as a direction of columns. The size of rectangular grid can be freely determined. In the embodiment, the lengthes of the grid along the directions Y, Z are both one tenth of the wavelength of electromagnetic wave to be converged. The length of the grid along the direction X is equal to the thickness of the substrate sheet 3 in the direction X. In alternative embodiments, the lengthes of the material unit along the direction X, Y, Z direction can be one fifty to one half of the wavelength of electromagnetic wave to be converged.

Each material unit 2 includes a substrate unit 30 and an artificial microstructure 4 attached to the surface of the substrate unit 30. In the embodiment, the artificial microstructure 4 is in a planar "I" shaped and made from metal wires, the artificial microstructure 4 includes a first metal wire in straight line and two second metal wires which are respectively perpendicularly connected with the two ends of the first metal wire.

The artificial microstructure 4 can also be other shapes, such as a flat two-dimensional snowflake shape, which includes two first metal wires and four second metal wires. The first metal wires are mutually orthogonal. Each first metal wire includes two ends. Each second metal wire is perpendicularly connected to one end of each first metal wire.

The artificial microstructure 4 further can be a three-dimensional snowflake shape, which includes three first metal wires and six second metal wires. Every two first metal wires are mutually orthogonal such the three first metal wires intersect at a same point. Each first metal wire includes two ends. Each second metal wire is perpendicularly connected to one ends of each first metal wire. The three-dimensional artificial microstructure 4 can be attached to the inside of the substrate 3 through a certain processing technology.

In alternative embodiments, the artificial microstructure 4 has a variety of implementations. As long as the metal wires or a microstructure formed by the metal wires with a certain geometric pattern can generate responses to the electromagnetic wave, namely the microstructure can change electromagnetic characteristics. It can be regarded as the artificial microstructure 4 attached to the surface of the substrate 3 or embedded in the inside of the substrate 3 to form the material unit 2.

Each substrate unit 30 and the artificial microstructure 4 attached to the each substrate unit 30 cooperatively determined the permittivity and permeability of the material unit 2 which is composed of them. According to the expression n= $\sqrt{\varepsilon\mu}$, as the permittivity and permeability are known, the refractive index n can be obtained. The size of refractive index indicates the influence degree in the direction of electromagnetic wave propagation. Therefore through design of shape and size of each artificial microstructure and so on, it can change the permittivity and permeability of each material unit 2, such to obtain certain refractive index distribution to achieve the deflection, convergence or divergence of the electromagnetic wave and so on.

For conventional artificial electromagnetic materials, the artificial microstructure 4 can usually made from silver, copper and other materials of non-ferrous metal. Because silver and copper are good conductors. A surface plasma effect is generated on the surface of metal structure. The good conductors also can stimulate and enhance the surface plasma effect as much as possible and thus the electromagnetic wave response is more sensitive and the effect is stronger.

The substrate 3 is required to be chosen from the materials which cannot generate response and influence for electromagnetic wave or the influence is as lower as possible. The permittivity and permeability must be close to 1 as much as possible. Ceramic is usually chosen as a material for the substrate of the conventional artificial electromagnetic materials.

Under cooperative functions of the artificial microstructure 4 and substrate unit 30, the artificial electromagnetic material shows the electromagnetic characteristic which common nature materials without, such as negative refraction, convergent beam, deflection beam, and beam parallel characteristics. According to physical characteristics, it extends many new applications, such as in communication, optics, device miniaturization, and detection and so on.

However, because the artificial microstructure 4 and the substrate 3 are opaque material, the conventional artificial electromagnetic materials are mainly applied in microwave band and can not have the effect to visible light wave. In the disclosure, the word "transparent" means that the light transmittance of a material is equal to or greater than 85%.

The first innovation point of the invention is that the transparent materials are used for substrate 3, such as transparent organic polymer materials and so on. In a preferred embodiment, the transparent organic glass, namely polymethyl methacrylate of which an abbreviated form is PMMA, is used for the substrate 3 of the invention. The other transparent organic polymer materials used for the substrate 3 also can be transparent polyurethane, polyethylene (PE), low density polyethylene (LDPE), polypropylene (PP), polyethylene glycol terephthalate (PET), polyvinyl chloride (PVC) and so on.

The dielectric constant of these materials used for the substrate is not high and is chosen from 1 to 3. The permeability is substantially 1. It meets the premise requirement of substrate 3. At the same time, these materials can be transparent or translucent through current technologies of the manufacturing process to let visible light wave travels through.

The second innovation point of the invention is that the artificial micro structure 4 is also made from transparent or translucent materials. In the embodiment, the indium tin oxide is used for the microstructure 4.

Indium tin oxide (ITO, also known as tin doped indium oxide) is a kind of mixtures composed of indium oxide $In_2O_3$ and tin oxide $SnO_2$, and usually the mass percentage of $In_2O_3$ is ranged from 80% to 95%. In the embodiment, the mass percentage is $In_2O_3$ 90%, and the mass percentage is $SnO_2$ 10%. When the indium tin oxide is in a film shape, as the thickness is ranged from 50 to 1000 nm, it is colorless and transparent. It can be used as conductive film to replace the silver wire and the copper wire, at the same time indium tin oxide also has good light transmittance.

Indium tin oxide has good electrical conductivity, therefore being able to achieve the function that silver, and copper and other good conductor can achieve. Therefore indium tin oxide can replace silver and copper to be the raw materials in the artificial microstructure 4 of the artificial electromagnetic material.

When manufacturing the artificial electromagnetic material, transparent polymer materials such as the transparent organic glass can be used for substrate 3. A variety of artificial microstructures 4 are formed on the surface of the substrate 3 by electron beam evaporation, physical vapor deposition, or sputtering deposition technologies such as to form a material sheet 1. Several material sheets 1 can be encapsulated to be a whole piece of the artificial electromagnetic material. Because the substrate 3 and the artificial microstructures 4 are transparent material, therefore the artificial electromagnetic material can be used in visible light wave field. It can greatly expand the application fields and the application ranges of the artificial electromagnetic materials. It has important scientific value and economic value.

Figure 3:
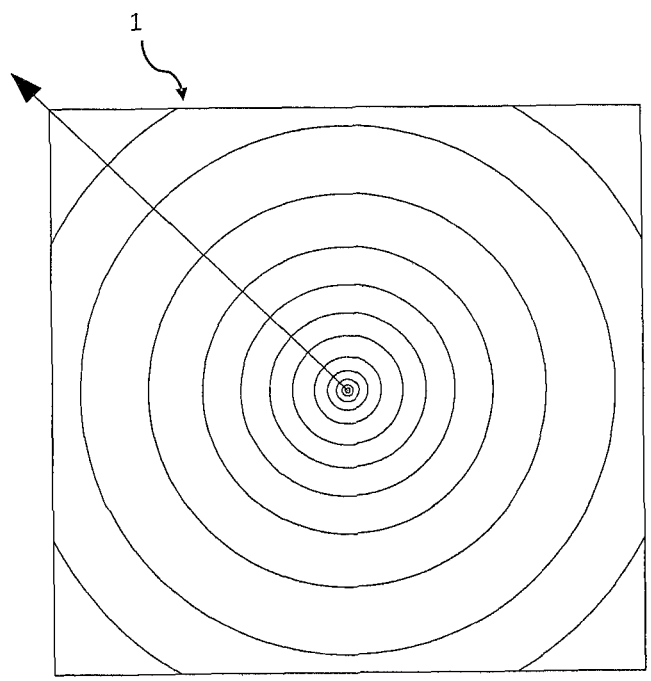
FIG. 3 a schematic showing refractive indexes of each material layer of the artificial electromagnetic material of FIG. 1.

For example, to design a material sheet 1, the refractive index of material sheet varies according to a number of concentrical circles, as shown in FIG. 3. The material unit 2 in the center of material sheet is treated as the center of the concentrical circles. Material units 2 which have the same distance to the center of the concentrical circles are positioned on the same circle. The refractive indexes of materials units positioned on the same circle are the same. The refractive indexes of the material units positioned in the same circle decrease when the radius of the circle increases. Refractive index difference between two adjacent neighbored circles gradually increases when the radiuses of the circles increase. The material sheet 1 with the refractive index varies according to a number of concentrical circles meets the condition can achieve the convergence of the electromagnetic wave. For the artificial microstructure 4 with the same shape, the smaller the artificial microstructure is, the lower the refractive index of corresponding material unit 2 is.

Figure 4:
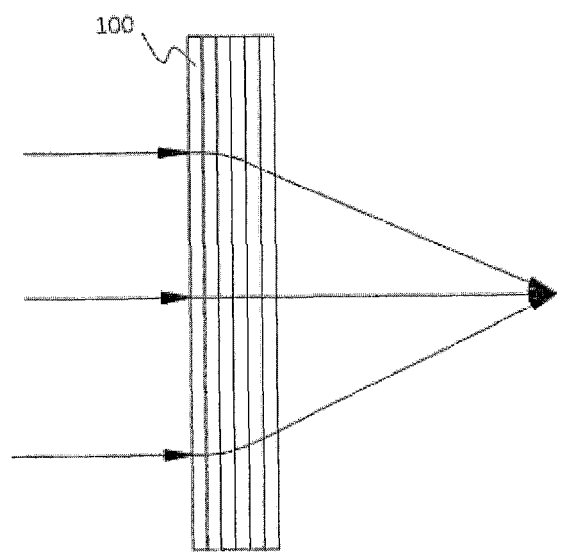
FIG. 4 a schematic showing the artificial electromagnetic material of FIG. 3 converge electromagnetic waves.

As shown in FIG. 4, several material sheets 1 of FIG. 3 are stacked to form an artificial electromagnetic material 100. A parallel beam of visible light wave can travel through the transparent substrate 3 and the artificial microstructures 4. The refractive indexes vary according to a number of concentrical circles which the material units 2 positioned make the visible light wave converge to a point to achieve the similar function of a convex lens.

Figure 5:
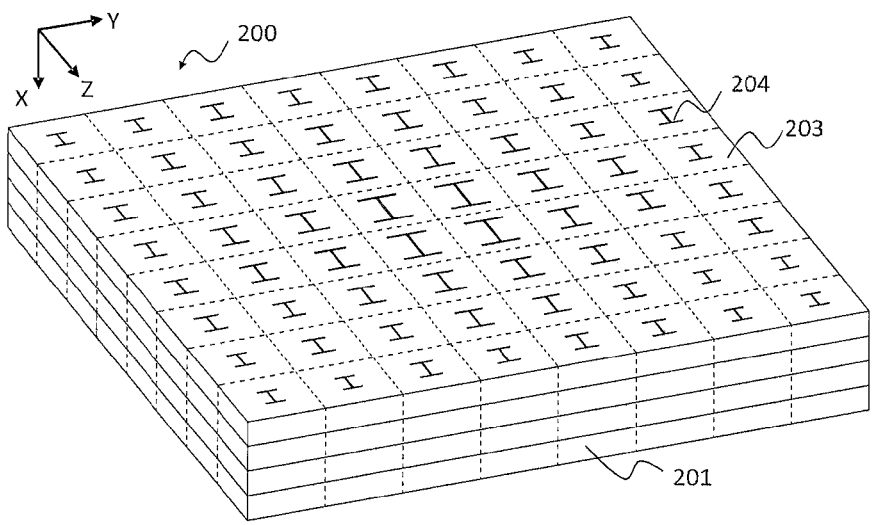
FIG. 5 illustrates an artificial electromagnetic material of a second embodiment.

Referring to FIG. 5, the difference between the artificial electromagnetic material 200 provided in a second embodiment of the invention and the artificial electromagnetic material in a first embodiment is that the artificial electromagnetic material 200 of the artificial microstructure 204 is carbon nanotube film.

As a new material, carbon nanotube is very light and has high strength characteristics. More importantly, carbon nanotube has excellent conductive property. When the diameter of the carbon nanotube is less than 6 nanometers (nm), it can be treated as one-dimensional quantum conductive wire with good electrically conductivity.

The carbon nanotube film of the invention, is one type of film which contains carbon nanotubes. The carbon nanotube includes an ion conductive polymer adhesive and carbon nanotubes dispersed in the adhesive. The adhesive is sulfonyl fluorinated polyethylene, or as carboxyl group, the acyl phosphate or sub sulfamoyl of thermoplastic polymer.

The thickness of the carbon nanotube film is ranged from 50 to 1000 nm. The carbon nanotube is transparent and colorless and has good electrical conductivity, therefore can be used as the conductive film to replace silver and copper to make the artificial microstructure respond to the electromagnetic wave. At the same time, it also has good light transmittance, such applications of artificial electromagnetic material can be extended from microwave field to visible light wave field.

When manufacturing the artificial electromagnetic material, carbon nanotube is dispersed in aqueous solvent to form carbon nanotube solution and the ion conducting polymer adhesive is dissolved in ethanol solvent to form ion conducting polymer adhesive water solution. Then the carbon nanotube solution is mixed with the ionic conductive polymer adhesive solution. The mixed solution is stirred by an agitator. Then the stirred solution is coated onto the substrate 203 made from transparent organic glass of polymer material. Water and ethanol vaporize and carbon nanotube film is formed being adhered to the substrate. The carbon nanotube film forms the artificial microstructure 204. Each of the artificial microstructures 204 can be coated according to a certain designation, therefore making a material sheet 201. At last multiply of material sheets 201 are encapsulated into a whole of artificial electromagnetic material. In alternative embodiment, the carbon nanotube film can also be attached to the substrate 203 through other methods. The carbon nanotube film can not only use ionic conductive polymer adhesive to attach the carbon nanotube to the surface of the substrate, but also can through other material or method to achieve the carbon nanotube attached to substrate to form the film. The carbon nanotube film of the invention has a certain thickness of the carbon nanotube to be formed the film.

Figure 6:
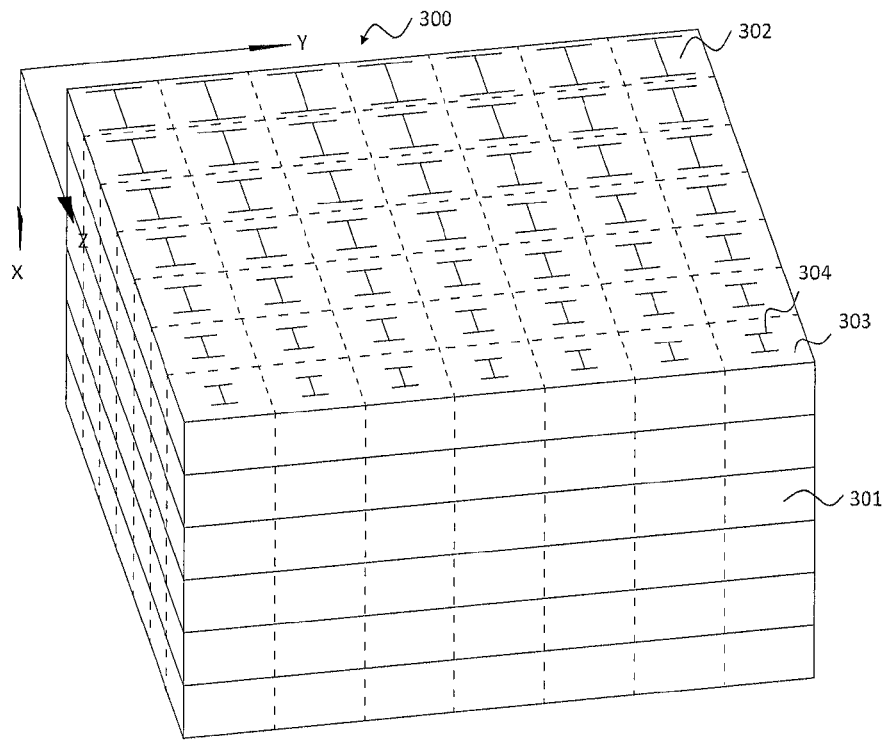
FIG. 6 illustrates an artificial electromagnetic material of a third embodiment.
Figure 7:
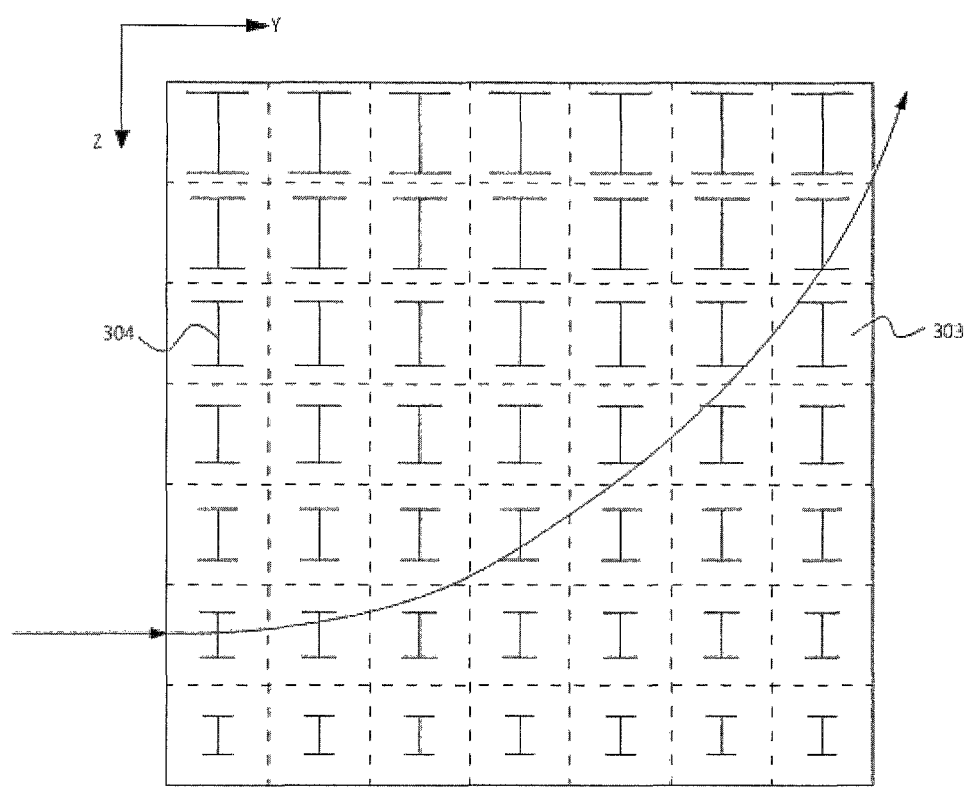
FIG. 7 illustrates that the electromagnetic wave is deflected by the artificial electromagnetic material of FIG. 6.

Referring to FIG. 6 and FIG. 7, the mainly difference between the artificial electromagnetic material 300 provided in a third embodiment of the invention and the artificial electromagnetic material of a first embodiment is, aluminum doped zinc oxide thin film is used in the artificial microstructure 304 of the artificial electromagnetic material 300.

Aluminum doped zinc oxide (abbreviation for ZAO) film, is get from Al doped in ZnO system. ZnO film has many grains with C axis preferentially growth. Each of grains is hexagonal lead-zinc mine structure with good growth. ZnO crystal is composed of oxygen six angle close-packed and zinc six angle compactly-stacked and reversely nested. The structure of the film has transparent conductivity, however the resistance is great. When Al doped in ZnO, ZAO film can be formed and the electrical resistivity is greatly reduced. Therefore it has good conductive performance, at the same time the stability of the film is greatly improved.

The thickness of the aluminum doped zinc oxide is usually ranged from 50 to 1000 nm. The aluminum doped zinc oxide is transparent and colorless. The light transmittance is reached to 90%. Because of good electrical conductivity, it can be used as conductive film to replace silver and copper to make artificial microstructure respond to the electromagnetic wave. At the same time, application can extended from microwave field to the visible light wave for good light transmittance of the electromagnetic material.

When manufacturing artificial electromagnetic material, the substrate 303 made from transparent polymer materials such as the transparent organic glass is firstly prepared, a protection film is attached to the substrate 303. The protection film defines a plurality of through holes with the same shape as the artificial microstructure. ZAO can be deposited on the protection film through evaporation. The ZAO will be directly attached to the substrate 3 by the through holes. After removing the protection film, the substrate attached with the artificial microstructure made from ZAO film is obtained. Therefore a material sheet 301 is obtained. At last several material sheets 301 are encapsulated into a complete artificial electromagnetic material 300.

In alternative embodiments, the aluminum doped zinc oxide thin film also can be obtained through other methods to be attached to the substrate 303 to form an artificial microstructure 304. All current techniques for manufacturing the aluminum doped zinc oxide thin film can be used in the present invention, using for the preparation of artificial microstructure of aluminum doped zinc oxide.

Along the X direction and the Y direction the artificial microstructures of each of columns are the same, and along the Z direction the artificial microstructures of each of columns have the same geometric shape while the size gradually decreases. The refractive index along X and Y direction keeps the same and the refractive index along Z direction gradually decreases. The material sheet 1 which meets the refractive index distribution can achieve the electromagnetic deflection. As shown in FIG. 7, the electromagnetic wave traveling from low refractive index to the transparent synthetic material will be deflected to the high refractive index direction.

Of course, through design of artificial microstructure of each of material unit, it can achieve a variety of refractive index distributions to achieve the electromagnetic wave deflection, divergence and other functions that the common artificial electromagnetic material can not achieve. In the invention because of transparent substrate and artificial microstructure, the electromagnetic wave can be extended from microwave band to visible light band. It is a revolutionary progress and useful to replace the traditional optical elements such as convex lens, concave mirror, and the material sheet of the invention is planar board without the need for special designations of convex or concave or complex surface. It greatly simplify the designation process and manufacturing process. It can effectively reduce the costs of designation and manufacturing.

The disclosure described above is only a preferred embodiment in the present invention. Of course not to limit the scope of the right, so identical change made corroding to the present invention claim is still belongs to the scope of the invention.

What is claimed is:

1. An artificial electromagnetic material comprising:
    at least one material sheet, each comprising a laminary substrate and a plurality of artificial microstructures attached to the substrate, wherein the substrate is made from transparent material and the plurality of artificial microstructures attached to the substrate are arranged in an array, wherein the sizes of the plurality of artificial microstructures decrease along one direction of the array.

2. The artificial electromagnetic material of claim 1, wherein the substrate is made from a transparent polymer material.

3. The artificial electromagnetic material of claim 2, wherein the substrate is made from polymethyl methacrylate.

4. The artificial electromagnetic material of claim 2, wherein the substrate is made from transparent polyurethane, polyethylene, polyethylene glycol terephthalate or pvc.

5. The artificial electromagnetic material of claim 2, wherein the light transmittance of the artificial electromagnetic material is equal to or greater than 85%.

6. The artificial electromagnetic material of claim 1, wherein the plurality of artificial microstructures are made from indium tin oxide, wherein the indium tin oxide is a mixed material composed of $In_2O_3$ and $SnO_2$.

7. The artificial electromagnetic material of claim 6, wherein the mass percentage of $In_2O_3$ in the indium tin oxide ranges from 80% to 95%.

8. The artificial electromagnetic material of claim 7, wherein the mass percentage of $In_2O_3$ in the indium tin oxide is 90%.

9. The artificial electromagnetic material of claim 6, wherein the indium tin oxide is manufactured into a film, the thickness of the film is between 50 to 1000 nm.

10. The artificial electromagnetic material of claim 1, wherein each artificial microstructure of the plurality of artificial microstructures is a carbon nanotube film with a geometric pattern.

11. The artificial electromagnetic material of claim 10, wherein the light transmittance of the carbon nanotube film is equal to or greater than 80%.

12. The artificial electromagnetic material of claim 10, wherein the thickness of the carbon nanotube film ranges from 50 to 1000 nm.

13. The artificial electromagnetic material of claim 10, wherein the carbon nanotube film comprises an ion conductive polymer adhesive and the carbon nanotubes are dispersed in the electrical ion conductive polymer adhesive.

14. The artificial electromagnetic material of claim 1, wherein each artificial microstructure of the plurality of artificial microstructures is an aluminum doped zinc oxide thin film with a geometric pattern.

15. The artificial electromagnetic material of claim 14, wherein the light transmittance of each aluminum doped zinc oxide thin film is greater than 80%.

16. The artificial electromagnetic material of claim 14, wherein the thickness of each aluminum doped zinc oxide thin film ranges from 50 to 1000 nm.

17. The artificial electromagnetic material of claim 1, wherein each substrate is virtually divided into a plurality of substrate units arranged in an array and one artificial microstructure is attached to each substrate units of the plurality of substrate units, and wherein a material unit is composed of one substrate unit and one artificial microstructure attached to the one substrate unit.

18. An artificial electromagnetic material comprising:
    at least one material sheet, each comprising a laminary substrate and a plurality of artificial microstructures attached to the substrate, wherein the substrate is made from transparent material, wherein each substrate is virtually divided into a plurality of substrate units arranged in an array and one artificial microstructure is attached to each substrate unit of the plurality of substrate units, wherein a material unit is composed of one substrate unit and one artificial microstructure attached to the one substrate unit, and
    wherein the material units are arranged to form a plurality of concentric circles, the material unit in the center of each material sheet is treated as the center of the plurality of concentric circles, the material units which have the same distance to the center of the plurality of concentric circles form the same circle, the refractive indexes of the material units forming the same circle are the same, the refractive indexes of the material units gradually decrease as the radius of a circle of the plurality of concentric circles increases, and the refractive index difference value between two adjacent concentric circles of the plurality of concentric circles gradually increases as the radii of the two adjacent concentric circles increase.

* * * * *